US011161073B2

(12) United States Patent
Mettler et al.

(10) Patent No.: US 11,161,073 B2
(45) Date of Patent: Nov. 2, 2021

(54) SEPARATION OF $CO_2$ FROM GAS MIXTURES

(71) Applicant: ExxonMobil Research and Engineering Company, Annandale, NJ (US)

(72) Inventors: Matthew S. Mettler, Tomball, TX (US); Ashish B. Mhadeshwar, Garnet Valley, PA (US); Rustom M. Billimoria, Hellertown, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 16/781,066

(22) Filed: Feb. 4, 2020

(65) Prior Publication Data

US 2020/0171424 A1    Jun. 4, 2020

Related U.S. Application Data

(63) Continuation of application No. 15/841,618, filed on Dec. 14, 2017, now abandoned.

(60) Provisional application No. 62/437,723, filed on Dec. 22, 2016.

(51) Int. Cl.
  *B01D 53/14* (2006.01)
  *B01D 53/62* (2006.01)

(52) U.S. Cl.
  CPC ..... *B01D 53/1475* (2013.01); *B01D 53/1412* (2013.01); *B01D 53/1425* (2013.01); *B01D 53/1493* (2013.01); *B01D 53/62* (2013.01); *B01D 2252/103* (2013.01); *B01D 2252/602* (2013.01); *B01D 2256/22* (2013.01); *B01D 2257/504* (2013.01); *Y02C 20/40* (2020.08)

(58) Field of Classification Search
  None
  See application file for complete search history.

(56) References Cited

PUBLICATIONS

Ballard, et al; "The Next Generation of Hydrate Prediction: An Overview", Journal of Supramolecular Chemistry, 2002, vol. 2, pp. 385-392.
Kang, et al; "Hydrate Phase Equilibria of the Guest Mixtures Containing CO2, N2 and Tetrahydrofuran", Fluid Phase Equilibria, 2001, vol. 185, p. 101.
McCabe, et al; "Graphical Design of Fractionating Columns", Industrial and Engineering Chemistry, 1925, vol. 17, No. 6, pp. 605-611.
Qanbari, et al; "Storage of CO2 as Hydrate Beneath the Ocean Floor", Energy Procedia, 2011, vol. 4, p. 3997.
Qanbari, et al; "CO2 Disposal as Hydrate in Ocean Sediments", Journal of Natural Gas Science and Engineering, 2012, vol. 8, p. 139.
Sloan, Jr., et al; "Fundamental Principles and Applications of Natural Gas Hydrates", Nature, 2003, vol. 426, p. 353.

*Primary Examiner* — Christopher P Jones
*Assistant Examiner* — Phillip Y Shao
(74) *Attorney, Agent, or Firm* — Liza Negron

(57) ABSTRACT

Processes for separating carbon dioxide from a gas mixture that comprises $CO_2$ and $N_2$ that are based upon formation of gas hydrates, and systems useful for implementing such processes, are disclosed.

11 Claims, 14 Drawing Sheets

SEPARATION OF CO$_2$ FROM GAS MIXTURES

CROSS-REFERENCE OF RELATED APPLICATIONS

This application is a continuation application filed under 37 C.F.R. 1.53(b) of parent U.S. application Ser. No. 15/841,618 filed on Dec. 14, 2017, the entirety of which is hereby incorporated herein by reference, which claims priority to U.S. Provisional Application No. 62/437,723 filed Dec. 22, 2016, the entire contents of which are incorporated herein by reference.

FIELD

This disclosure relates to separation of CO$_2$ from gas mixtures comprising N$_2$, such as combustion gases, which can be power plant flue gases.

BACKGROUND

Separation of CO$_2$ from power plant flue gas and other gas mixtures that result from industrial processes and other fixed point sources is critical for reducing greenhouse gas emissions, and especially such emissions due to electricity generation. Technologies exist today to remove CO$_2$ from flue gas, such as absorptive technologies based on amines, but these technologies are costly and significantly reduce overall power plant efficiency. An additional challenge of today's CO$_2$ separation processes is that subsurface geologic structures must be present and able to receive CO$_2$. Locations which do not have suitable geologic formations will not be able to sequester the CO$_2$, even if it can be separated from the flue gas mixture. Thus, there exists a need to develop an improved technology capable of not only removing CO$_2$ from flue gas or other industrially produced waste gas mixtures, but also providing the captured CO$_2$ in a form, such as a solid hydrate, that is amenable to sequestration by methods other than injection into subsurface geologic formations.

U.S. Pat. No. 5,434,330 describes a process for separating clathrate forming gases by first contacting a gaseous stream with an aqueous solvent to form a hydrate suspension. The clathrate forming gases are then selectively recovered by exposing the hydrate suspension (or the separated hydrate) to increased temperature and/or reduced pressure.

US20130012751 describes a process by which the corrosive elements of a gas stream (e.g. CO$_2$, H$_2$S) can be separated from hydrocarbon gases in a hydrate-based separator using a similar approach as outlined in the U.S. Pat. No. 5,434,330. The process yields a gas product, e.g. a purified natural gas product, that is less corrosive due to removal of H$_2$S and CO$_2$ from the natural gas.

SUMMARY

Disclosed is a technology based on hydrate-based gas separation in which CO$_2$ is preferentially captured into a hydrate structure to selectively remove CO$_2$ from a gas stream also including N$_2$ and/or O$_2$. The disclosed process and apparatus for implementing it provide improved separation of CO$_2$ from N$_2$ and O$_2$ from mixed gases, such as power plant flue gas, and improved energy and input material utilization. The CO$_2$ hydrate product of the process can be transported to suitable long term storage locations such as geologic formations or marine hydrate reservoirs. Alternatively, the CO$_2$ hydrate product can be decomposed (before or after transport to another site) and the resulting CO$_2$ gas can be used in subsequent industrial processes or the CO$_2$ hydrate can be sequestered. The N$_2$-rich product gas is sufficiently pure to be released to the atmosphere directly, or can be transported for use as an industrial gas or to drive a turbine, providing further energy recovery from the process.

Thus, in one aspect, a system for separating CO$_2$ from a gas mixture comprising CO$_2$ and N$_2$, such as combustion product or other gas, can include a hydrate formation reactor (HFR) that comprises an outer vessel configured:

with a plurality of stages arranged with a first stage proximal a first end of the vessel and second and any subsequent stages successively more proximal a second end of the vessel;

one or more gas feed inlets placed at a distance from the first end of the vessel the same as said distance of a stage that is a second or subsequent stage and configured to feed a gas stream into the vessel;

one or more aqueous phase inlets configured to feed an aqueous phase into the second end of the vessel or proximate thereto;

one or more hydrate slurry outlets configured to permit a draw off an aqueous phase hydrate slurry stream from the first end of the vessel or proximate thereto;

one or more gas product outlets configured to draw off a gas product stream from the second end of the vessel or proximate thereto; and a temperature control system effective to establish a temperature gradient or a series of temperature steps from a first temperature $T_1$ in a region proximate to the first end of the vessel to a second temperature $T_2$ in a region proximate to the second end of the vessel and controlling the temperature at each of the stages, wherein $T_1 > T_2$;

wherein the gas stream and the aqueous phase flow in a countercurrent manner through the vessel.

A gas feed to the hydrate formation reactor can include an inlet for adding a hydrate promoter to the gas feed. Such inlet for adding a hydrate promoter can include a mixer.

An aqueous phase inlet can be configured to input fresh aqueous phase into the HFR or to input recycled aqueous phase into the HFR. An aqueous phase inlet can be configured to include an inlet for adding a hydrate promoter to the aqueous phase. Such inlet for adding a hydrate promoter can include a mixer.

The CO$_2$ separation system can further include a solid-liquid separator for separating an aqueous hydrate slurry drawn from the hydrate formation reactor into an aqueous phase product and a solid hydrate, and then can also include an aqueous phase recirculating line that feeds the aqueous phase product of the solid-liquid separator fully or partially into the second end of the vessel or proximate thereto. The aqueous phase recirculating line can include a cooling plant for cooling the aqueous phase liquid product prior to introducing the recirculated aqueous phase back into the hydrate formation reactor. The aqueous phase recirculating line can alternatively or additionally include an inlet for adding a hydrate promoter to the recirculating aqueous phase.

In a further aspect, the present disclosure provides a hydrate formation-based process for purifying CO$_2$ from a gas comprising N$_2$ wherein the process comprises intimately contacting a feed gas stream comprising CO$_2$ and N$_2$ gases and a aqueous phase stream in a countercurrent flow to form a CO$_2$-rich hydrate in the aqueous phase, a temperature $T_f$ being maintained at a gas feed stage f in the countercurrent flow, a temperature $T_2$ such that $T_2 < T_f$ being maintained at a stage n>f, and a temperature $T_1$ being maintained at a stage m≤f such that $T_1 \geq T_f$; wherein: $T_2$ is in the range from the incipient vapor formation temperature for $CO_2$ to the incipient hydrate formation temperature for $CO_2$ at the operating pressure of the process, and $T_1$ is a temperature at or below a temperature of convergence of the incipient $CO_2$ hydrate formation and incipient $CO_2$ vapor formation curves at the operating pressure of the process. Typically, high pressure operation, e.g. 2200 psia or above (depending on the composition of the input gas—for example for separating flue gas from a natural gas combined cycle (NGCC) power plant), is required for effective separation of $CO_2$ from $N_2$ in a hydrate formation-based process. Thus, one or more hydrate promoters can optionally be added to the gas feed stream of the process. Additionally or alternatively, one or more hydrate promoters can be added to the aqueous phase used in the process. These additives have the effect of lowering the pressure, or raising the temperature, at which the process can operate (thermodynamic hydrate promoters) or improving the kinetics of hydrate formation (kinetic hydrate promoters).

The $CO_2$-rich hydrate product of the hydrate formation reactor can be transported as a source of $CO_2$ or sequestered to store the $CO_2$ trapped in the hydrate, or can be decomposed into a $CO_2$-rich gas for use in other industrial processes.

The $N_2$-rich gas product of the process obtained after separation of the gas stream from the aqueous phase can be used in other industrial processes, or can be stored at a pressure above atmospheric pressure or transported directly from the hydrate formation reactor to be used to drive a turbine or other pressure-differential engine to generate electricity or perform other useful work.

DETAILED DESCRIPTION

Definitions

Figure 1:
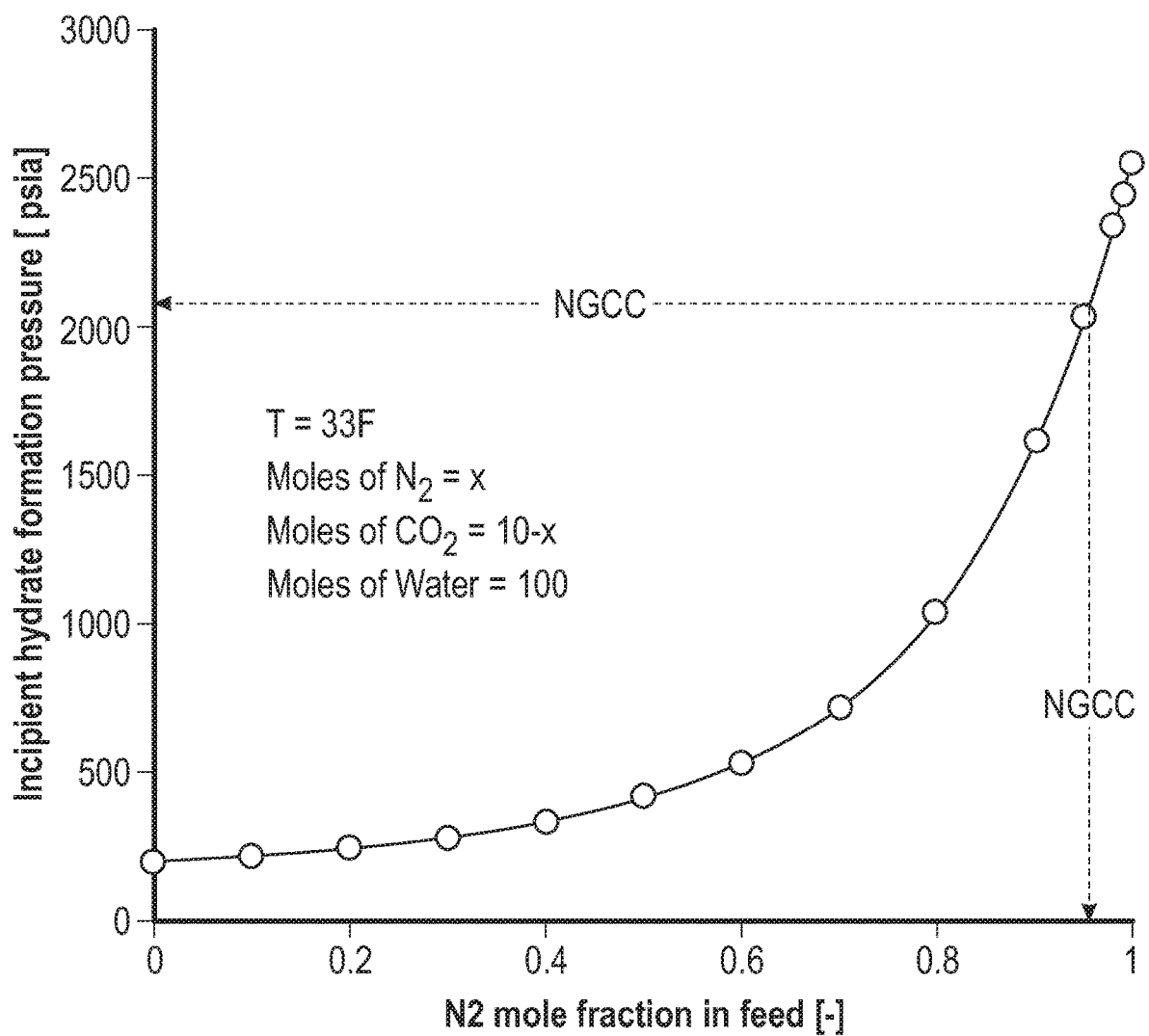
FIG. 1 is a graph of a $N_2$—$CO_2$ hydrate formation phase diagram at 33° F.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the apparatuses and processes encompassed are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, "about" is a preposition describing some quantity or parameter value, and indicates that some variation around the stated amount or value is included. Generally, the degree of variation intended to be encompassed is that which would be understood by one of ordinary skill in the art not to materially affect the performance of an apparatus or device or a characteristic of a material or composition described by the amount or parameter. The degree of variation encompassed can be influenced by the ability of an artisan or ordinary skill to measure or control the amount or value in operation of a process or production of a substance or composition. In some instances, variation of up to 10% is envisioned. In some instances variation of up to 5% is envisioned. In some instances variation of up to 1% is envisioned. In some instances, variation of up to 0.5% is envisioned. In some instances, variation of up to 0.1% is envisioned. In the specific instance of the temperature of each stage of a HFR, "about" is intended to encompass 2-3% variation.

As used herein, an "aqueous phase" is water, a water solution of one or more dissolved substances, or either of these that includes a suspension of hydrate particles. The "dissolved substances" of a water solution can include molecules of gas partitioned into the aqueous phase from a gas being separated by the presently disclosed process. "Dissolved substances" can also include salts and organic molecules, either added to or originally present in the water forming the aqueous phase (for example substances present in seawater that might be used as the aqueous phase in some embodiments). "Dissolved substances" can also include thermodynamic hydrate promoters and kinetic hydrate promoters added to the aqueous phase. "Dissolved substances" can also include dissolved clathrates that have not agglomerated into substantial particles. "Hydrate particles" can include particles of sufficiently small size to remain suspended by flow of a slurry of the particles in the aqueous phase, and can also include aggregates of clathrate particles that have accreted to a size visible to the naked eye or larger, e.g. as to settle from a standing aqueous phase under the influence of gravity. Hydrate collected from disclosed processes and apparatus can be in solid form of substantial mass.

As used herein, a "clathrate" is a weak composite made of a host compound that forms a basic framework and a guest compound that is held in the host framework by intermolecular interaction, such as hydrogen bonding, Van der Waals forces, and the like. Clathrates may also be called "host-guest complexes", "inclusion compounds", and "adducts". As used herein, "clathrate" and "hydrate" are interchangeable terms used to indicate a clathrate having a basic framework made from water as the host compound. A hydrate is a crystalline solid which looks like ice, and forms when water molecules form a cage-like structure around a "hydrate-forming constituent."

Formation of a hydrate or clathrate is described herein as a "reaction", since a stable structure is formed (under appropriate conditions) from two previously separated compounds, although no chemical bonds are changed.

Figure 3:
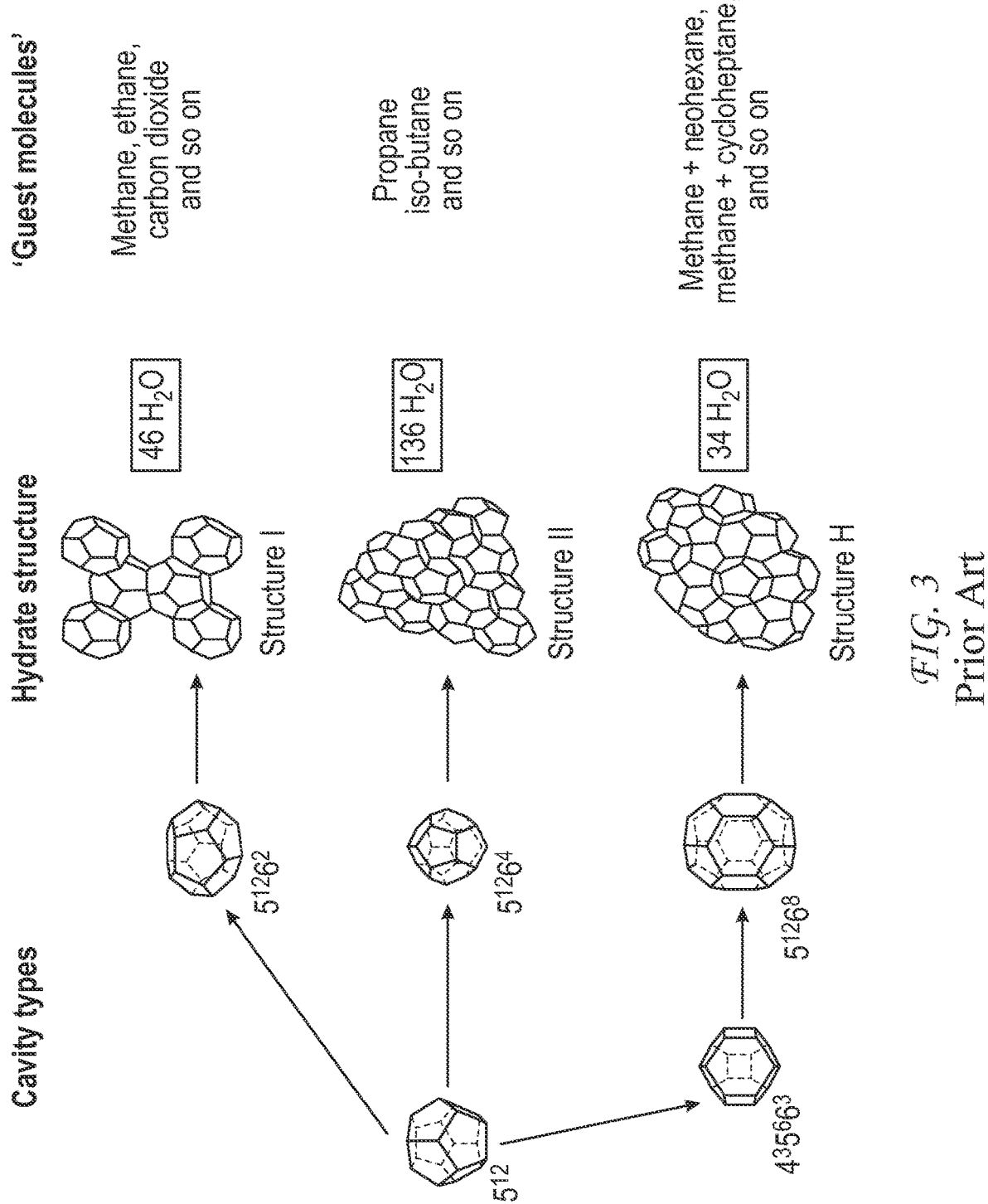
FIG. 3 illustrates various hydrate forms. (E. Dendy Sloan Jr., "Fundamental principles and applications of natural gas hydrates", *Nature*, vol. 426, p. 353 (2003).)

FIG. 3 shows some various framework structures of water-molecule clathrates and examples of molecular guests that can be found within them.

As used herein, a "hydrate-forming constituent" refers to a compound or molecule in a fluid, including natural gas, that forms hydrate at elevated pressures and/or reduced temperatures. Illustrative hydrate-forming constituents include hydrocarbons such as methane, ethane, propane, butane, neopentane, ethylene, propylene, isobutylene, cyclopropane, cyclobutane, cyclopentane, cyclohexane, and benzene. Hydrate-forming constituents can also include non-hydrocarbons, such as oxygen, nitrogen, hydrogen sulfide, carbon dioxide, sulfur dioxide, and chlorine.

As used herein, a "compressor" is a machine that increases the pressure of a gas by the application of work (compression). Accordingly, a low pressure gas (for example, at 5 psig) may be compressed into a high-pressure gas (for example, at 1000 psig) for transmission through a pipeline, injection into a well, or other processes.

As used herein, a "column", "tower" or "reactor" means a fractionation column or zone, i.e., a contacting column or zone, wherein liquid and vapor phases can be countercurrently contacted to effect separation of compounds in a mixture of phases. For example, a separation in a vapor-liquid-hydrate system may be performed by contacting of the vapor and liquid phases (which can include hydrate under appropriate conditions) on a series of vertically spaced trays or plates mounted within a column and/or on packing elements such as structured or random packing. Further, a separation of compounds in a mixture of solid, liquid, and vapor phases may be effected by a contacting countercurrent flow of the solid and/or liquid phases (which may contain hydrate) in an opposite direction to a vapor phase.

As used herein, a "geologic formation" is any finite subsurface region. A geologic formation may encompass a large open space, either naturally or man-made, and/or may contain one or more hydrocarbon containing layers, one or more non-hydrocarbon containing layers, an overburden, and/or an underburden of any subsurface geologic formation. An "overburden" and/or an "underburden" is geological material above or below the geologic formation of interest.

As used herein, the term "gas" is used interchangeably with "vapor," and means a substance or mixture of substances in the gaseous state as distinguished from the liquid or solid state. Likewise, the term "liquid" means a substance or mixture of substances in the liquid stat as distinguished from the gas or solid state. As used herein, "fluid" is a generic term that may include either a gas or vapor.

As used herein, "kinetic hydrate promoter" ("KHP") refers to a molecule and/or compound or mixture of molecules and/or compounds capable of increasing the rate of hydrate formation in a fluid that is either liquid or gas phase. A kinetic hydrate promoter can be a solid or liquid at room temperature and/or operating conditions.

As used herein, the term "minimum effective operating pressure" refers to the pressure below which hydrates do not form in fluids containing hydrate forming constituents during the time the fluids are resident in a vessel or line.

As used herein, the term "maximum effective operating temperature" refers to the temperature above which hydrates do not form in fluids containing hydrate forming constituents during the time the fluids are resident in a vessel or line. For thermodynamic promotion of hydrate formation only, the maximum effective operating temperature is higher than the maximum effective operating temperature in the absence of the addition of a THP. When a kinetic hydrate promoter is added together with a THP, the maximum effective operating temperature is typically higher than the thermodynamically promoted hydrate formation temperature.

As used herein, a "McCabe-Thiele plot" is a graph of an equilibrium concentration between two chemical components showing the concentration ratio of the components in each of two phases. In the graph, operating lines are used to define the mass balance relationships between the components. A McCabe-Thiele plot can be used to design a separation system based on the different concentrations of each of the components in each of the different phases. While McCabe-Thiele plots are generally used to design distillation columns based on vapor-liquid equilibriums, they can be applied to separations base on any phase equilibrium, such as the clathrate-liquid equilibrium discussed herein.

Construction of a McCabe-Thiele plot from equilibrium calculations is considered to be within the skill of the ordinary artisan. A vapor-liquid equilibrium curve can be constructed from a mixture phase diagram. (W. L. McCabe & E. W. Thiele, *Industrial and Engineering Chemistry*, vol., pp. 605-611 (1925).—see also https://en.wikipedia/org/wiki/McCabe%E2%80%93Thiele_method.)

As used herein, a "plant" is a known apparatus or a collection of known apparatuses operably connected to perform a stated function. For example, a "cooling plant" will include equipment for chilling of a liquid passing through the cooling plant. A "facility" is a collection of plants that together accomplish one or more functions. In its broadest sense, the term plant I applied to any equipment that may be present along a flow path of a system as disclosed herein.

As used herein, "pressure" is the force exerted per unit area by the gas on walls enclosing a volume. Pressure can be shown as pounds per square inch (psi). "Atmospheric pressure" refers to the local pressure of the air. "Absolute pressure" (psia) refers to the sum of the atmospheric pressure (14.7 psia at standard conditions) plus the gage pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning. For a pure component in an enclosed system at a given pressure, the component vapor pressure is essentially equal to the total pressure in the system.

As used herein, a "stage" in a column or reactor is a zone of controlled temperature within the reactor. The temperature to be set at each stage in the reactor can be determined by calculating phase diagrams for vapor-liquid (v-l), vapor-liquid-hydrate (v-l-h) and liquid-hydrate (l-h) phase diagrams for a feed gas composition, of the two gases to be separated ($N_2$ and $CO_2$, for example, as below) for mol % of one of the gases to be separated from the feed vs. temperature at a given pressure. A temperature for the first stage can be selected by picking a temperature between the equilibrium incipient hydrate curve and incipient vapor curve at the composition desired in the hydrate phase. A temperature of the last stage is selected by picking the temperature on the incipient vapor curve at the composition desired in the gas phase. Temperatures of intermediate phases, if any, are identified by noting the composition of the incipient vapor at the temperature selected for the first stage, then noting the temperature of the incipient hydrate curve at this composition as the temperature for the second stage. The temperature of the third stage is selected by noting the composition at the incipient vapor curve at the temperature of the second stage, then noting the temperature of the incipient hydrate curve at this composition, etc.

Stages in a hydrate formation reactor are implemented by establishing a zone of controlled temperature at a particular section of a hydrate forming reactor, as described further below.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, "thermodynamic hydrate promoter" (THP) refers to a molecule and/or compound, or mixture of molecules and/or compounds capable of reducing the hydrate formation pressure (at a given temperature) in a fluid that is either liquid or gas phase. The addition of a THP to the fluid also has the effect of raising the temperature at which hydrates form at a given pressure.

Figure 10:
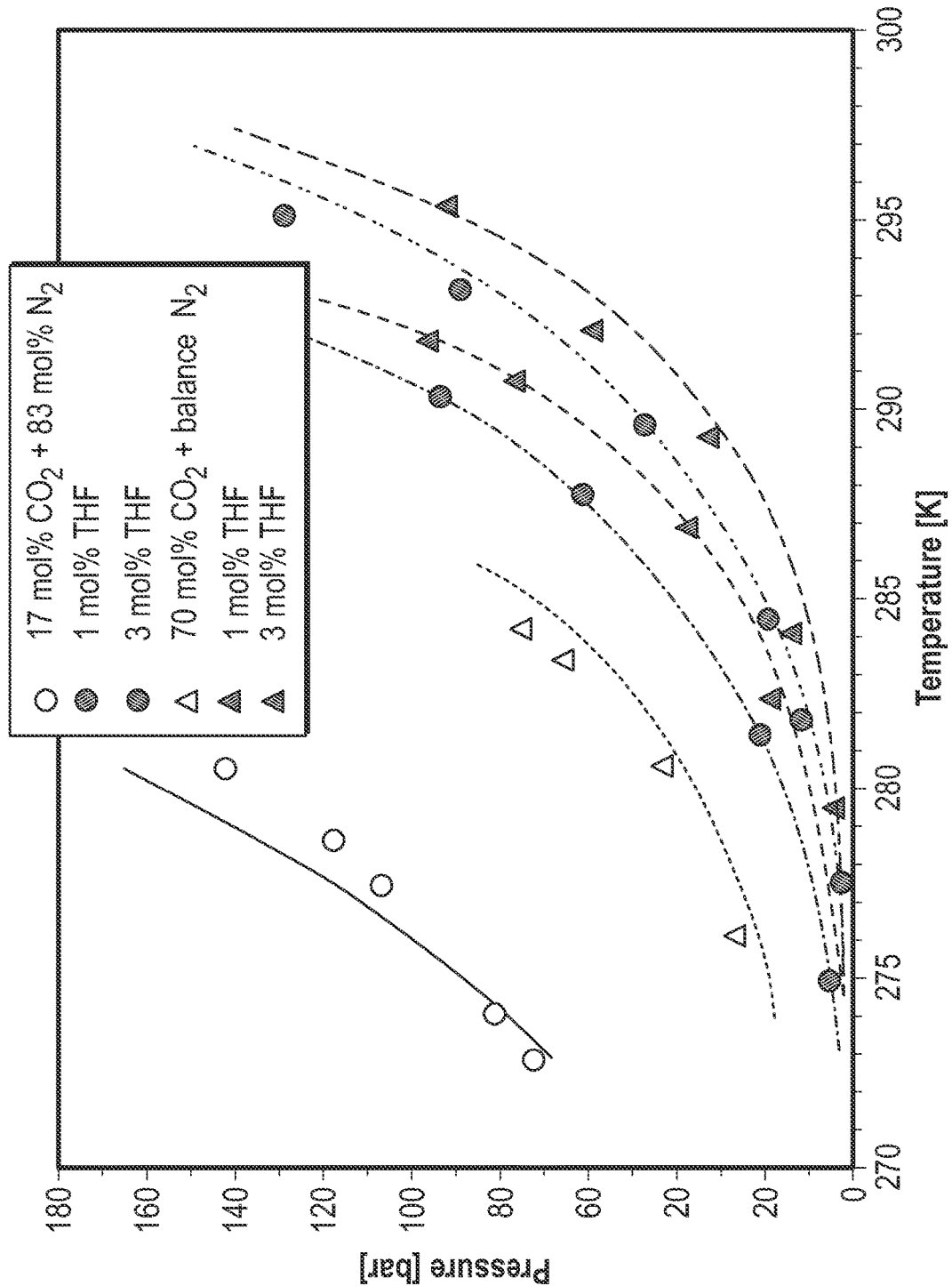
FIG. 10 shows hydrate formation phase diagrams for a 17:83 mol % $CO_2$—$N_2$ mixture and for such mixtures to which varying amounts of THF are added. S. Kang, H. Lee, C. Lee, and W. Sung, "Hydrate phase equilibria of the guest mixture containing $CO_2$, $N_2$, and Tetrahydrofuran", *Fluid Phase Equilibria*, vol. 185, p. 101 (2001).

The effect of adding a hydrate promoter to the process is shown, for example, in FIG. 10, showing the effect on a gas separation of adding varying amounts of Tetrahydrofuran (THF) to a binary mixture of $CO_2$ and $N_2$.

A system for separation of $CO_2$ from combustion product or other gases includes a hydrate formation reactor in which $CO_2$ from the combustion gas is partitioned into a hydrate phase by a countercurrent flow against an aqueous phase. The hydrate formation reactor comprises an outer vessel configured:

with a plurality of stages arranged with a first stage proximal a first end of the vessel and second and any subsequent stages successively more proximal a second end of the vessel;

one or more gas feed inlets placed at a distance distal from the first end of the vessel the same as said distance of a stage that is a second or subsequent stage and configured to feed a gas stream into the vessel;

one or more aqueous phase inlets configured to feed an aqueous phase into the second end of the vessel or proximate thereto;

one or more hydrate slurry outlets configured to draw off a hydrate slurry stream from the first end of the vessel or proximate thereto;

one or more gas product outlets configured to draw off a gas product stream from the second end of the vessel or proximate thereto; and a temperature control system effective to establish a temperature gradient or a series of temperature steps from a first temperature $T_1$ in a region proximate to the first end of the vessel to a second temperature $T_2$ in a region proximate to the second end of the vessel, and controlling the temperature at each of the stages, wherein $T_1 > T_2$;

wherein the gas stream and the aqueous phase flow in a countercurrent manner through the vessel.

The hydrate forming reactor accomplishes intimate mixing of the gas and aqueous phases in a countercurrent flow. Apparatus and methods for mixing gases and aqueous phases are known, and include bubbling of gas through a column of the aqueous phase, venturi-type mixers, "bubble tray" or "liquid tray" arrangements within towers that are contacted with a flow of the liquid phase or with a flow of the gas phase, respectively, and distribution of the aqueous phase as a mist or fine droplets that are carried through the gas phase or fall through it under the influence of gravity. See, for example, U.S. Pat. Nos. 2,410,583, 5,434,330, 6,111,155, 6,028,234, 6,797,039 and US20130012751, all hereby incorporated by reference in their entirety and for all purposes.

The hydrate forming reactor also comprises a series of stages, which are established by creating zones within the reactor that are controlled to a selected temperature by either refrigeration or heating as necessary. For example, in a reactor in which a flow of gas upward is contacted by a flow of aqueous phase as a falling mist, zones of defined temperature can be established by baffles perforated by riser tubes, each baffle being configured to carry a heat exchange fluid so as to control the temperature of the baffle and associated riser tubes to a selected temperature by heating or refrigeration of the heat exchange fluid. As another example, in a "tray" arrangement, the temperatures of each of the trays can be individually controlled.

A gas feed inlet to the HFR is configured to feed a gas stream into the vessel. The gas feed can be located at the first end (which can be the bottom, if the HFR is oriented vertically) of the vessel encompassing the HFR, but is typically located some distance from the first end so that a "feed stage" can be established that is somewhat distal from the first end, allowing for separation stages upstream (for the gas flow) from the gas feed inlet. The particular form of the gas feed inlet will depend upon the overall design of the HRF. For example, if a feed is bubbled into the reactor, a sparger or an arrangement of a plurality of small nozzles might be used as the gas inlet. Heating or cooling apparatus, a pump or compressor, and the like, can be incorporated into a gas feed inlet to the HFR. Control of the gas feed, including of its temperature and pressure, is considered well-known in the art.

The gas feed inlet of the HFR can be configured to include an inlet that allows for introducing a hydrate promoter into the gas phase.

An aqueous phase inlet is configured to feed an aqueous phase into the vessel. An aqueous phase inlet can include an input for fresh, "make-up" water.

The aqueous phase inlet is typically placed at the second end of the vessel that encompasses the HFR, although alternative arrangements are also envisioned in which a number of aqueous phase inlets are provided distributed along the length of the HFR proximate to the second end of the HFR. As for the gas inlet, the specific form of the aqueous phase inlet will depend on the overall design of the HFR. For example, if the counterflow of the aqueous phase is in the form of a falling mist, the aqueous phase inlet can be arranged as a plurality of fine nozzles disposed around the circumference of the top of the HFR that is oriented vertically.

The aqueous phase inlet can be configured to include a mixer for introducing an amount of one or more hydrate promoters, in either liquid or solid form, into the aqueous phase.

The aqueous phase inlet can also be configured to include a mixer for introducing one or more inorganic or organic salts or surfactants into the aqueous phase. The salt(s) may be added in solid form or as a solution. A salt solution of the aqueous phase allows chilling of the aqueous phase to temperatures below 32° F. (0° C.). Ocean water may be used as the aqueous phase.

The form of the hydrate slurry outlet(s) of the HFR is considered known in the art and again the specific form will depend on the overall design of the HFR and also to the form of the hydrate (e.g. particle size) and its concentration in the slurry.

The form of the one or more gas product outlets is also considered known in the art, and again the specific form will depend on the overall design of the HFR. The end use of the product gas will be considered in selecting the form of the gas product outlet. For instance, if the product gas is to be discharged to the atmosphere as a pure gas, a simple pressure release valve can suffice. On the other hand, if the product gas is to be used to drive a turbine, then the product gas outlet will be configured with appropriate couplings for attaching to a gas pipeline or storage vessel and to appropriate pressure controls.

A system for separating $CO_2$ from combustion or other gases can include a plurality of HFRs arranged in series. In such an arrangement, the hydrate product from a first HFR is decomposed and the gas released from the first decomposed hydrate is used as the gas feed (which can be mixed with, e.g. a hydrate promoter as described below) into a second HFR. Such a second or yet additional HFR(s) can be operated at the same pressure and/or temperature as the first HFR, or can be operated at a reduced pressure and/or different temperature gradient or step series, compared to the pressure and temperatures in the first, or upstream HFR (e.g., 2200 psia for the first of two HFRs, and 1000 psia for the second of two HFRs). A measurement of the composition of gas released from the decomposed hydrate obtained from an upstream HFR or calculation of the composition of the hydrate from equilibrium principles can be used to set the composition of the input gas for calculation of the staging to be used in a respectively downstream HFR.

In an alternative arrangement, the slurry from the first HFR is transported to a second HFR for use in the aqueous phase, and different conditions of pressure and/or temperature are used in the second reactor to change the hydrate composition. Whatever gas is released during a pressure change can be combined with the $N_2$-rich phase for power recovery, or put to another industrial use, or vented to the atmosphere if the gas does not contain a lot of $CO_2$.

A hydrate formation promoter can be added to either the gas stream or to the aqueous phase. Hydrate formation promoters can be of either the thermodynamic or kinetic type. A thermodynamic hydrate formation promoter ("THP") changes the equilibrium conditions for hydrate formation and will lower the pressure at which hydrates are able to form. A kinetic hydrate formation promoter ("KHP") accelerates the rate of hydrate formation without changing the equilibrium conditions. Examples of THPs include acetone, propane, isobutane, cyclopentane, carbon tetrachloride, bromoform, chloroform, ethylene dichloride, methylene chloride, methyl iodide, methylene iodide, and the tri-halogen compounds of methane and ethane, propylene oxide, 1,4-dioxane, tetrahydrofuran and $H_2S$, surfactants (e.g. TBAB—Tetra n-Butyl Ammonium Bromide, TBAF—Tetra n-Butyl Ammonium Fluoride, TBACl—Teta n-Butyl Ammonium Chloride), and enzymes (glucoamylase). Examples of KHPs include surfactants (e.g. SDS—Sodium Dodecyl Sulfate, DTAC—Dodecyl Trimethyl Ammonium Chloride) and inorganic or organic salts (e.g. NaCl).

A system for separating $CO_2$ from combustion or other gases can further include a solid-liquid (SLS) separator configured to receive an aqueous hydrate slurry from the hydrate slurry outlet for separation into an aqueous phase product and a solid hydrate. The SLS can be integral with the HFR at the first end of the vessel. In such an instance of a SLS integral with the HFR, the hydrate slurry outlet can be replaced by an outlet suitable for conveying a solid hydrate material from the HFR and an outlet suitable for conveying an aqueous phase from the HFR. The hydrate product of the SLS can be collected and transported and/or sequestered as a concentrated hydrate product, or decomposed as described further below.

When the system includes a SLS, the system can further include an aqueous phase recirculation line that connects a reservoir or pipe of the SLS holding the recovered aqueous phase to the vessel of the HFR, typically via the aqueous phase inlet, but in some embodiments a separate inlet for the recirculating aqueous phase can be provided. Aqueous phase recovered from the hydrate separation can be recirculated back to the HFR via this line. The aqueous phase recirculation line can include a cooling plant to cool the aqueous phase prior to introducing the recycled aqueous phase back into the HFR. The aqueous phase recirculating line can alternatively or additionally include an inlet for adding a kinetic hydrate promoter to the recirculating aqueous phase.

A system for separating $CO_2$ from a mixture of gases comprising $N_2$ can additionally or alternatively include a hydrate decomposition facility ("HDF"). The HDF can be operably connected directly to the hydrate slurry outlet of the HFR, or the HDF can be operably connected to receive the concentrated hydrate product (which can be in the form of a concentrated slurry or a solid) from the SLS. A HDF generally comprises a hydrate decomposition plant ("HDP") and a vapor-liquid separator ("VLS")

The hydrate decomposition plant decomposes the hydrate into its component gas(es) and an aqueous phase comprising the empty clathrate and water. The decomposition can be effected by either heating of the hydrate or reducing the pressure under which it is kept, or a combination of both. Accordingly, the HDP can contain either or both of a heater for raising the temperature of the hydrate or apparatus for lowering the pressure under which the hydrate is maintained at the outlet of the HFR or SLS.

The HDF further includes a VLS for separating a vapor product from an aqueous phase. The VLS is configured such that the vapor product of the VLS is collected and stored and/or transported for use in another industrial process. The VLS can be further configured so that the aqueous phase liquid product is returned to the vessel of the HFR via an aqueous phase recirculating line. The aqueous phase recirculating line can include a cooling plant for cooling the aqueous phase liquid product. Additionally or alternatively, the aqueous phase recirculating line can include an input for adding a hydrate promoter and/or an inorganic or organic salt to the aqueous phase.

Unless otherwise indicated, for instance by more detailed description, movement of gases and fluids, and control of their temperature and pressure, is considered known in the art. Accordingly, the flow lines, inlets and outlets described herein may be considered to include apparatus for moving and controlling the flow of fluids between and within components of the systems disclosed, such as pumps, compressors, valves of different kinds, meters, feedback controls, digital controls and the like, as one of ordinary skill in the art would expect to use.

Figure 4:
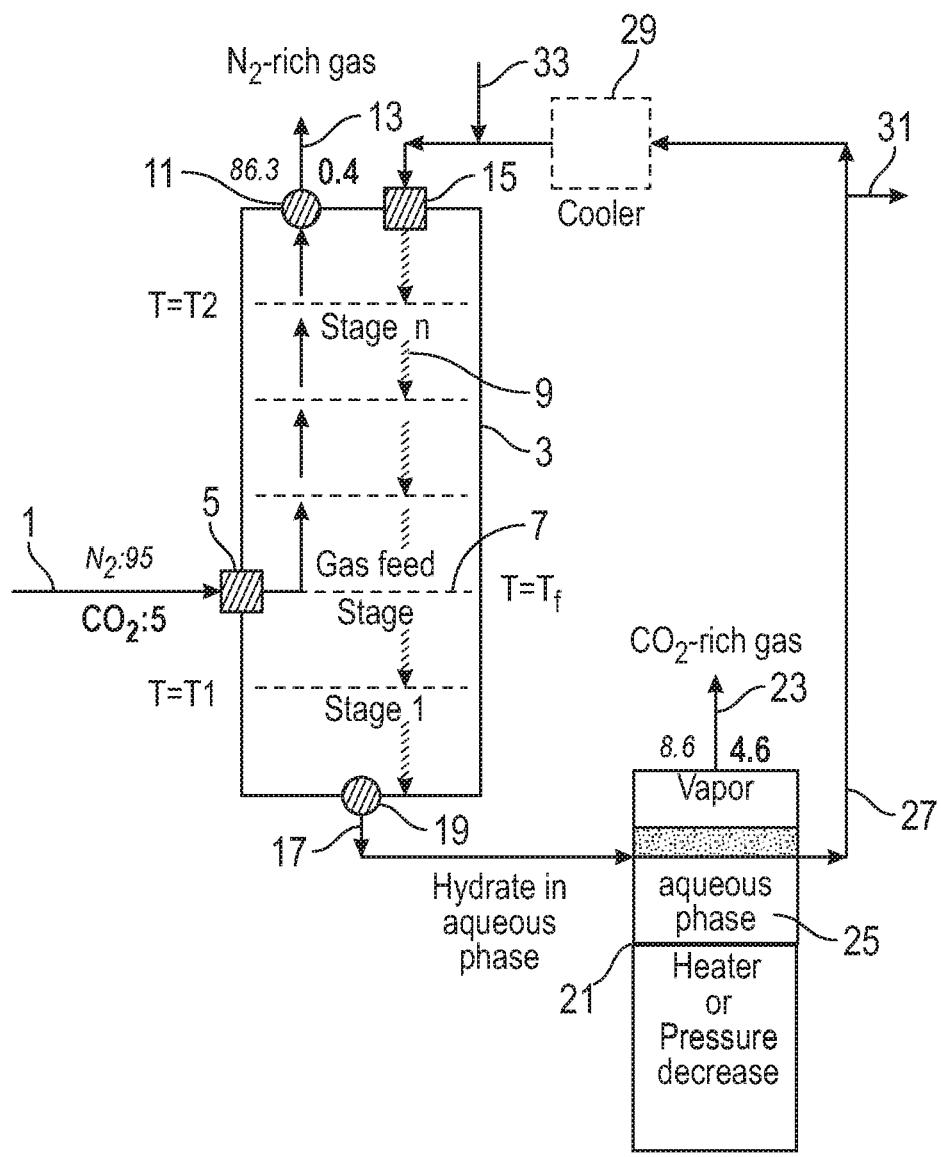
FIG. 4 is an illustration of a system for separating $CO_2$ from a mixture of gases.

FIG. 4 illustrates an embodiment of a system for hydrate-based gas separation. A feed gas stream 1 enters a hydrate formation reactor (HFR) 3 via a gas inlet 5 located at a gas feed stage 7. The gas feed stage is maintained at a temperature $T_f$. The gas stream flows in countercurrent fashion in contact with an aqueous phase stream 9, through a stage n and out a product gas outlet of the HFR 11. Stage n is maintained at a temperature $T_2$. The product gas 13 is stored, put to use or vented to the atmosphere.

The aqueous phase stream enters the hydrate formation reactor via an aqueous phase inlet 15 and flows countercurrent to the gas stream and exits the hydrate formation reactor as a hydrate slurry 17 via a hydrate slurry outlet 19. The aqueous phase hydrate slurry is transported to a hydrate decomposition facility 21 that includes both a hydrate decomposition plant (HDP) and a vapor-liquid separator (VLS). The hydrate is decomposed in the HDP into the component gas(es) and the aqueous phase (water or a water solution) by operation of a heater or by lowering the pressure under which the hydrate is maintained. The resulting gas(es) and aqueous phase are separated one from another in the VLS to obtain a captured gas 23 and regenerated aqueous phase 25. The regenerated aqueous phase leaves the VLS via an aqueous phase recirculating line 27. The regenerated aqueous phase is recirculated to the HFR via the aqueous phase inlet. The aqueous phase recirculating line optionally includes a cooling plant 29 for cooling the aqueous phase. The aqueous phase recirculating line also includes a bleed 31 for drawing off portions of the aqueous phase. The aqueous phase recirculating line, and/or the aqueous phase inlet of the HFR, contains a water make-up inlet 33 for introducing fresh water into the system. The concentration of solutes in the aqueous phase can be adjusted by adding fresh water and/or removing aqueous phase via the water make-up and bleed.

Figure 5:
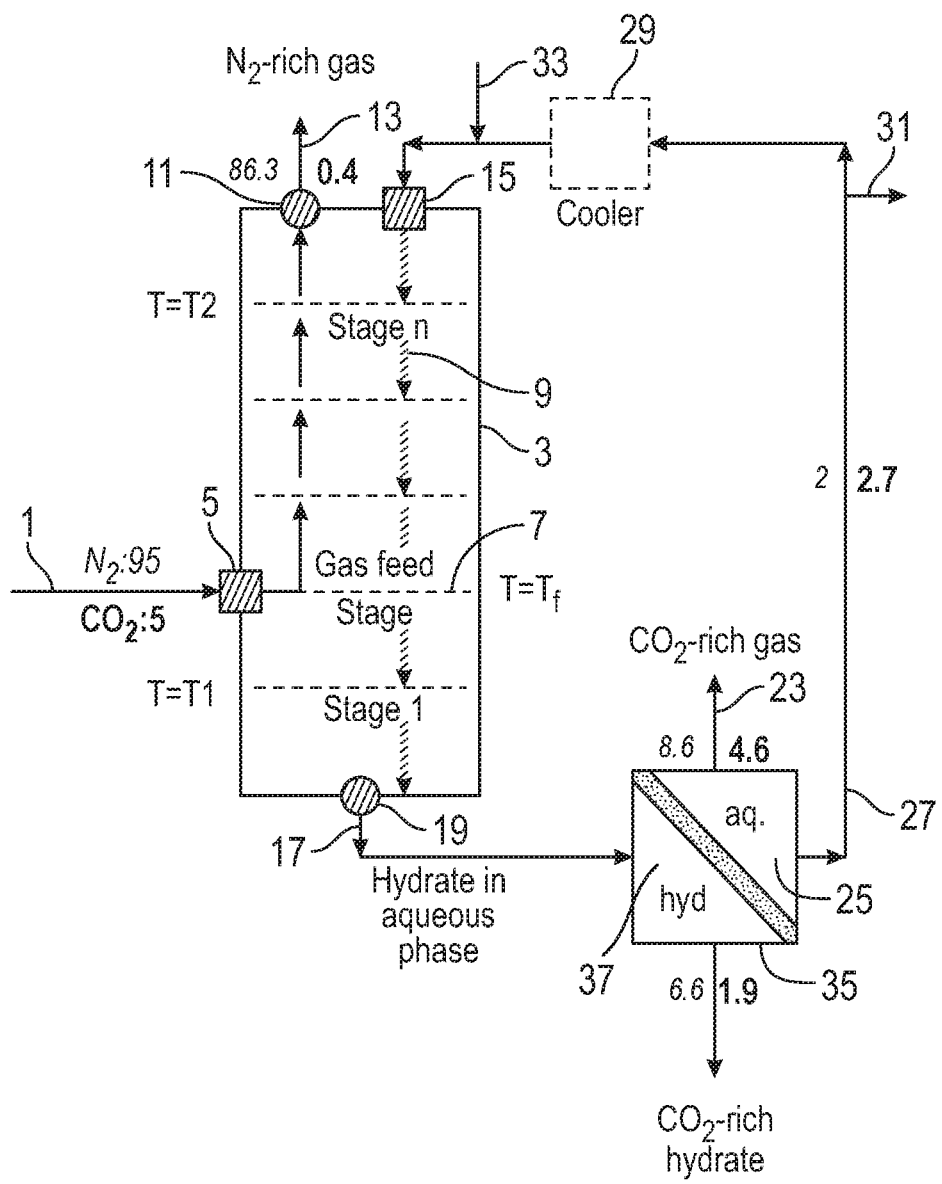
FIG. 5 is an illustration of another system for separating $CO_2$ from a mixture of gases.

FIG. 5 illustrates another embodiment of a system for hydrate-based gas separation. A feed gas stream 1 enters a hydrate formation reactor (HFR) 3 via a gas inlet 5 located at a gas feed stage 7. The gas feed stage is maintained at a temperature $T_f$. The gas stream flows in countercurrent fashion in contact with an aqueous phase stream 9, through a stage n and out a product gas outlet of the HFR 11. Stage n is maintained at a temperature $T_2$. The product gas 13 is put to use or vented to the atmosphere.

The aqueous phase stream enters the hydrate formation reactor via an aqueous phase inlet 15 and flows countercurrent to the gas stream and exits the hydrate formation reactor as a hydrate slurry 17 via a hydrate slurry outlet 19. The aqueous phase hydrate slurry is transported to a hydrate separator plant 25 in which the hydrate slurry is separated into a captured gas-rich hydrate 37 (which may include some residual aqueous phase) and regenerated aqueous phase 25. The regenerated aqueous phase leaves the VLS via an aqueous phase recirculating line 27. The regenerated aqueous phase is recirculated to the HFR via the aqueous phase inlet. The aqueous phase recirculating line optionally includes a cooling plant 29 for cooling the aqueous phase. The aqueous phase recirculating line also includes a bleed 31 for drawing of portions of the aqueous phase. The aqueous phase recirculating line, and/or the aqueous phase inlet of the HFR, contains a water make-up inlet 33 for introducing fresh water into the system. The concentration of solutes in the aqueous phase can be adjusted by adding fresh water and/or removing aqueous phase via the water make-up and bleed.

The captured gas-rich hydrate can be sequestered, e.g. by placement in a geologic formation or in the ocean, optionally after encapsulation of the hydrate, or stored or transported for further industrial use.

Also provided is a process for purifying $CO_2$ from a gas comprising $N_2$. The process includes contacting a feed gas stream comprising $CO_2$ and $N_2$ gases and a aqueous phase stream in a countercurrent flow to form a $CO_2$-rich hydrate in the aqueous phase, a temperature $T_f$ being maintained at a gas feed stage f in the countercurrent flow, a temperature $T_2$ such that $T_2<T_f$ being maintained at a stage n>f, and a temperature $T_1$ being maintained at a stage m<f such that $T_1 \geq T_f$;

wherein:

$T_2$ is in the range from the incipient vapor temperature for $CO_2$ to the incipient hydrate temperature for $CO_2$ at the operating pressure of the process, and $T_1$ is a temperature at or below a temperature of convergence of the incipient $CO_2$ hydrate and incipient $CO_2$ vapor curves at the operating pressure of the process.

The gas of the gas feed stream is preferably one that includes some nitrogen.

Figure 8:
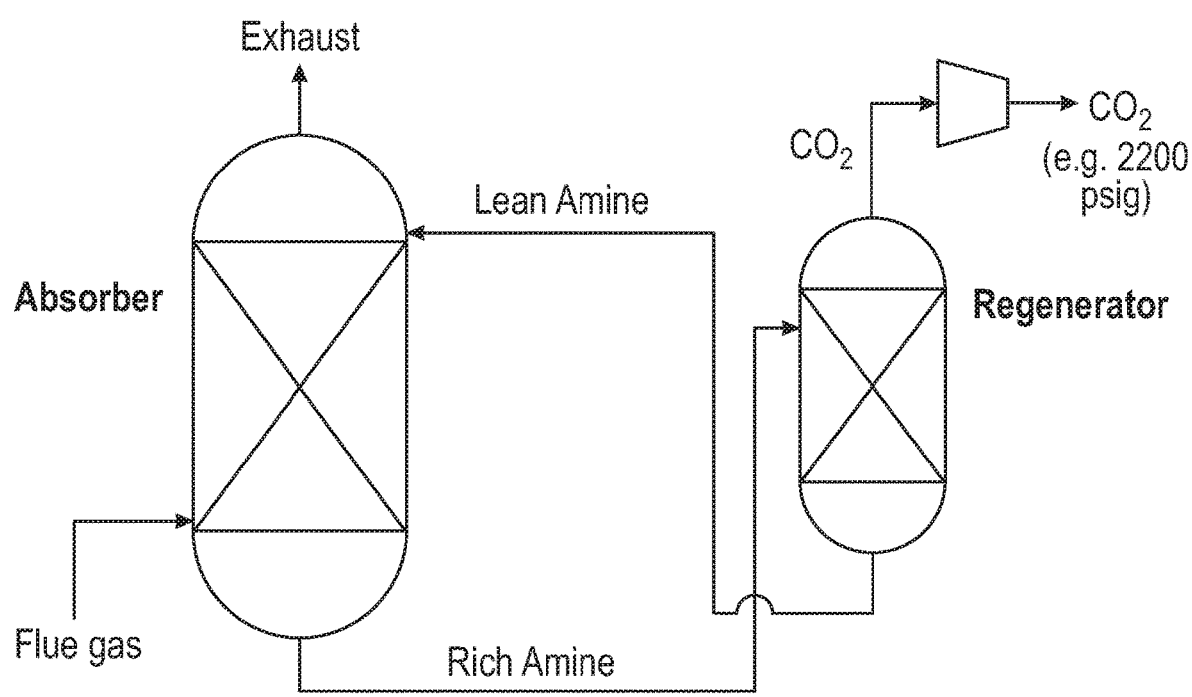
FIG. 8 is an illustration of an amine-based system for capturing $CO_2$ that can be used to concentrate $CO_2$ in a feed gas to a hydrate-based $CO_2$ separation process.

Typically gas resulting from combustion in air or an oxygen-rich atmosphere of a hydrocarbon or alcohol fuel, or a mixture thereof, is separated. Flue gas from a hydrocarbon-fired power plant, such a Natural Gas Combined Cycle or coal-fired power plant, can be separated in the present method. The feed gas can comprise $CO_2$ that has been concentrated by a prior-applied process, such as the known amine-based $CO_2$ capture process. FIG. 8 schematically illustrates such an amine-based $CO_2$ capture process.

The $CO_2$ in the gas feed is separated from at least $N_2$ and other gases by intimately contacting the gas feed stream with a stream of an aqueous phase under certain conditions of pressure and temperature in a countercurrent flow. The countercurrent flow and the conditions of temperature and pressure establish a series of "stages" in the HFR. The process is run isobarically within any one HFR, and so the stages of the separation in any one HFR are determined by variations in temperature. The equilibrium concentrations of $CO_2$ and $N_2$ and other gases in each of the gas and hydrate phases change at each stage. The process can be conducted using only one stage. In such an instance, $T_f=T_1=T_2$. Typically the process is conducted using at least two stages. In any event, the stages can be considered as a first stage at the lowest temperature in separation step, one or more—up to n—stages at progressively higher temperatures and a gas feed step f, which is the stage at which the gas feed inlet to the HFR is located. The gas feed stage can be at any stage. The gas feed stage is typically the first, second or third stage, most typically the second or third stage.

The design of the separation, that is determination of the overall operating pressure of the separation process, and the number of stages and their temperature can be performed using calculations from equilibrium principles, in the manner similar to the calculations for designing a distillation of a binary liquid.

Separation in the proposed multistage configuration is driven by varying operating conditions, in this instance temperature, at each stage. A single HFR system utilizes is ru isobarically using different temperatures for different stages. Stages can be implemented instead as a chain of coupled HFRs, each designed to run at different pressures.

At any given operating pressure, addition of warmer stages below the gas feed stage results in improved $CO_2$ purity and $N_2$ recovery, whereas addition of cooler stages above the gas feed stage result in improved $N_2$ purity and $CO_2$ recovery.

For determination of the operating pressure of the process, the feed gas composition is located along the x-axis of a plot of composition (as mole fraction) vs. incipient hydrate formation pressure for a $CO_2$—$N_2$ binary gas (FIG. 1). Power plant flue gas, typically has a composition comprising from about 5 mol % $CO_2$ and about 95% other gases, substantially $N_2$, but also minor amounts of other gases, to about 20 mol % $CO_2$ and about 80% other gases, again, substantially $N_2$ mixed with minor amounts of other gases. As shown in FIG. 1, (showing only a binary mixture of $CO_2$ and $N_2$) the operating pressure of the process is at least about 140 atm (about 2100 psia) at 33° F. (0.5° C.).

Figure 2:
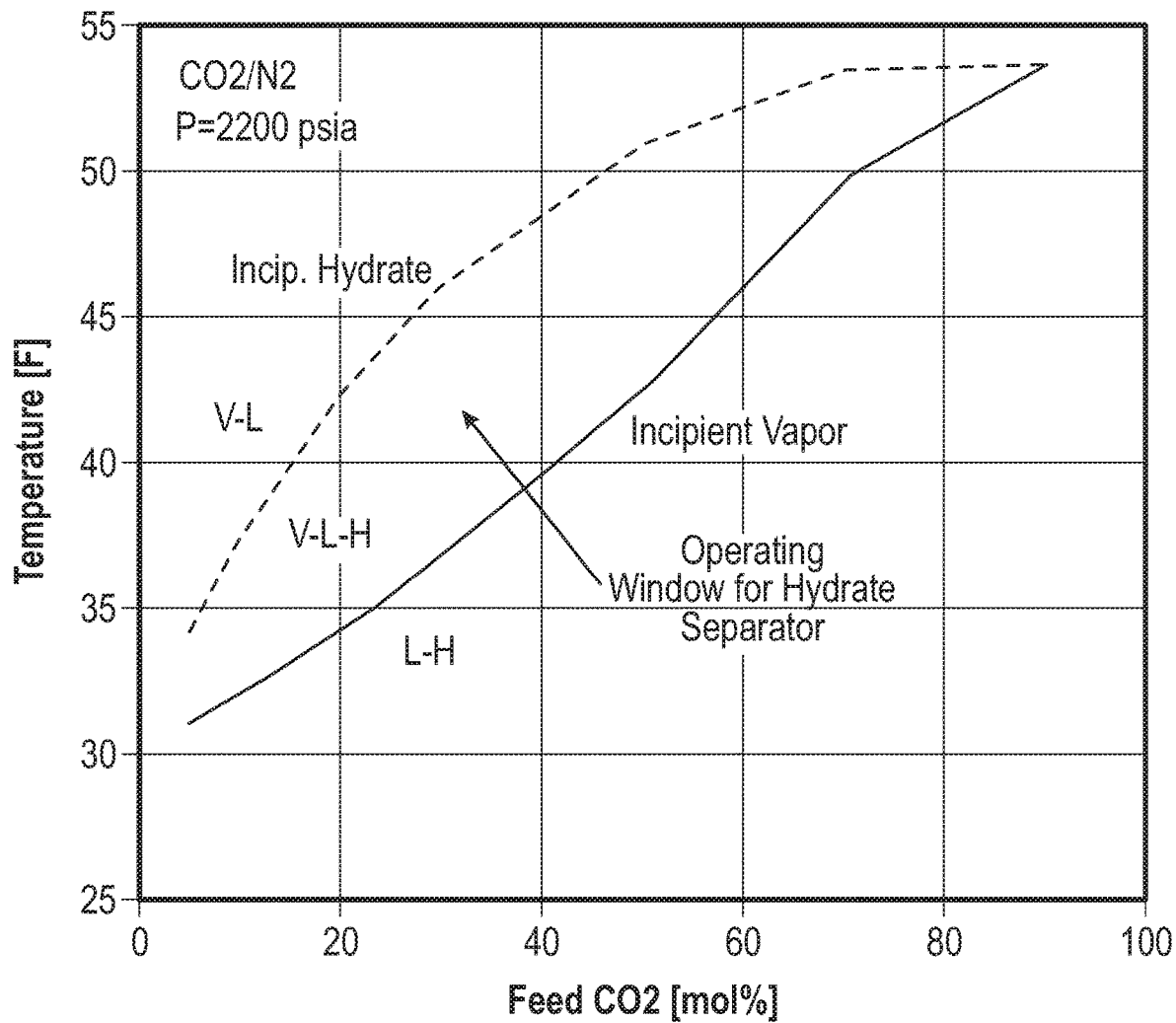
FIG. 2 is a graph of a hydrate formation phase diagram at 2200 psia.

A phase diagram (composition as mol % vs. temperature), similar to a boiling point diagram of a binary liquid mixture, can then be calculated for the vapor-liquid (V-L), vapor-liquid-hydrate (V-L-H) and liquid-hydrate (L-H) phases of the binary mixture at the selected pressure. FIG. 2 shows the calculated phase diagram of a $CO_2/N_2$ binary mixture at 2200 psia. Staging for the separation can then be derived either from a McCabe-Thiele plot of the equilibrium composition of vapor and hydrate at a desired pressure (typically the lowest pressure, or nearly so, that provides for hydrate formation of the feed gas composition), and then observing the temperatures at the incipient hydrate formation curve at the composition indicated for each of the stages.

Alternatively, staging can be designed by calculating phase diagrams for vapor-liquid (v-l), vapor-liquid-hydrate (v-l-h) and liquid-hydrate (l-h) phase diagrams for a feed gas composition, of the two gases to be separated ($N_2$ and $CO_2$, for example, as below) for mol % of one of the gases to be separated from the feed gas vs. temperature at a given pressure. A temperature for the first stage can be selected by picking a temperature between the equilibrium incipient hydrate formation curve and incipient vapor formation curve at the composition desired in the hydrate phase. A temperature of the last stage is then selected by picking the temperature on the incipient vapor formation curve at the composition desired in the gas captured in the hydrate. Temperatures of intermediate phases, if any, are then identified by noting the composition of the incipient vapor at the temperature selected for the first stage, then noting the temperature of the incipient hydrate formation curve at this composition as the temperature for the second stage. The temperature of the third stage is selected by noting the composition at the incipient vapor formation line at the temperature of the second stage, then noting the temperature of the incipient hydrate formation line at this composition, etc.

Figure 6:
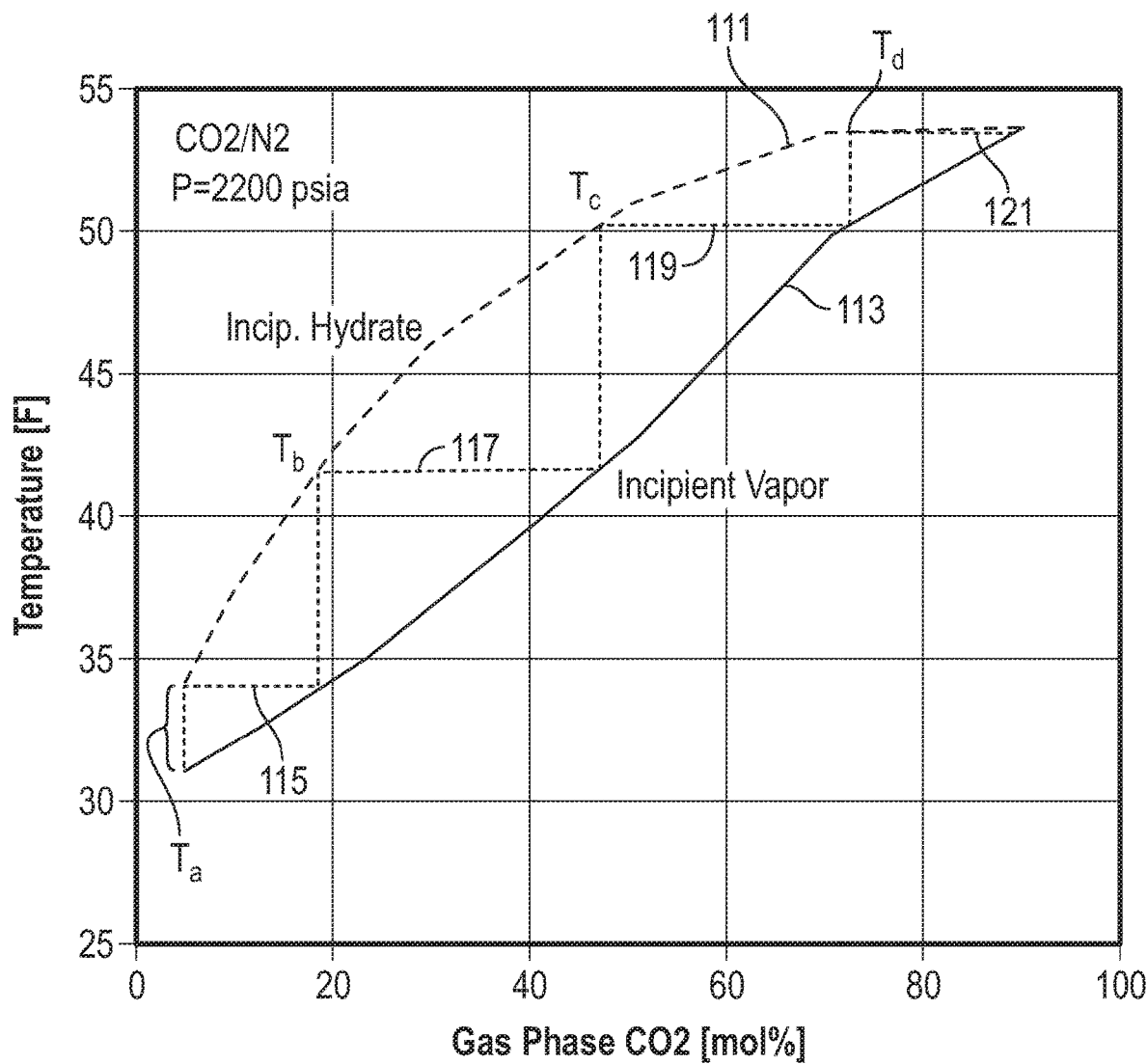
FIG. 6 illustrates a determination of staging in a $CO_2$ separating process.

FIG. 6 illustrates the determination of staging in the separation using the equilibrium curves as described above. A phase diagram for a gas binary mixture is calculated from equilibrium principles at a selected operating pressure to generate an incipient hydrate formation curve 111 and an incipient vapor formation curve 113. The plot is of temperature vs. composition (in mol %) of the binary mixture, similarly as a "boiling point" diagram used to design a distillation process. In FIG. 4 the mixture is of $CO_2$ and $N_2$ and the pressure is 2200 psia. A composition for the gas feed is chosen, and then a temperature in the range between the incipient hydrate formation curve 111 and an incipient vapor formation curve incipient hydrate formation curve and an incipient vapor formation curve is selected for the first stage temperature (Ta, in this instance 31° F.). A first "operating line" 115 is drawn at the temperature to the incipient vapor formation line. The intersection provides the composition of the gas at the next stage. The temperature at that composition shown on the incipient hydrate formation curve provides the temperature (Tb) of the next stage. A second operating line 117 is drawn to determine the composition of the gas at the next stage, which is in turn used to find the temperature for the next stage (Tc) at a third operating line 119. The iteration continues to identify a fourth temperature (Td) at a fourth operating line 121. A separation run in accord with this design is expected to provide purification of $CO_2/N_2$ mixture of 5 mol % $CO_2$/95 mol % $N_2$ to a composition of 90 mol % $CO_2$/10 mol % $N_2$.

We have developed a computational model of the hydrate-based separation process. The model includes a combination of hydrate formation thermodynamics and the multistage countercurrent operation, and generates results from these known principles. See, e.g. E. Dendy Sloan Jr. and C. Koh, "Clathrate Hydrates of Natural Gases", Third Edition, CRC Press, 2007 and A. L. Ballard and E. Dendy Sloan Jr., "The next generation of hydrate prediction: An overview", *Journal of Supramolecular Chemistry*, vol. 2, pp. 385-392 (2002). Both of these references are hereby incorporated by reference in their entirety and for all purposes. The integrated model takes as inputs feed composition and operating conditions and iteratively generates phase fractions and compositions as outputs.

A process for separating $CO_2$ from a gas mixture comprising $N_2$ can further include separating the gas stream from the aqueous phase after the contacting step and collecting a hydrate slurry formed in the aqueous phase and comprising hydrate particles enriched in $CO_2$. A process can further include concentrating the hydrate from the hydrate slurry and sequestering the hydrate from the atmosphere. The collecting and concentrating can be effected by a solid-liquid separator. The solid-liquid separator may, for example, include a device such as a conveyor belt or spinning drum separator. In other embodiments, the hydrate may be separated by falling through a tower, e.g. as described in US20130012751, hereby incorporated by reference. The separated hydrate can be sequestered on the deep ocean floor or buried in the sea floor at a depth sufficient to maintain the hydrate phase. See, e.g., F. Qanbari et al., "$CO_2$ disposal as hydrate in ocean sediments," *Journal of Natural Gas Science and Engineering*, vol. 8, p. 139 (2012); F. Qanbari et al., "Storage of $CO_2$ as hydrate beneath the ocean floor," *Energy Procedia*, vol. 4, p. 3997 (2011).

Additionally or alternatively, the hydrate can be encapsulated to sequester the host gas ($CO_2$). The sequestered hydrate can be stored on the deep ocean floor or in the sea floor at a depth sufficient to maintain the hydrate phase.

The separated hydrate can also be stored and/or transported for use in a further industrial process. Alternatively, the hydrate can be decomposed, by increasing the temperature at which it is maintained, by decreasing the pressure at which it is maintained, or by a combination of both.

The $CO_2$ gas released by the hydrate decomposition ("captured gas") can then be transported for use in a further industrial process or injected into a geologic formation either to sequester it or to pressurize a hydrocarbon production field. Alternatively, the captured gas can be used as a feed into an iteration of the separation process that is run under conditions appropriate to the input captured gas composition.

Additionally or alternatively, the product gas of the separation, for example a $N_2$-rich gas, can be collected after the step of contacting the gas with the aqueous phase. The collected product gas can be stored under a pressure above atmospheric pressure or transported under pressure to be used for generating energy, e.g. by moving a turbine, or to do other useful work as a compressed gas. Alternatively, the product gas might be adjudged sufficiently pure to be released into the atmosphere or used as an input substance to an industrial process.

In one embodiment of a separation of $CO_2$ from a gas mixture comprising $N_2$, the process is conducted at 2200 psia, $T_2$ is from 31 to 34° F. (−0.5 to 1.1° C.) and $T_1$ is about 54° F. (12.2° C.).

In another embodiment of a separation of $CO_2$ from a gas mixture comprising $N_2$, the hydrate separation is conducted in 3 stages and $T_f$ is about 33° F. (0.5° C.), $T_1$ is about 35° F. (1.6° C.) and $T_2$ is about 31° F. (−0.5° C.).

In any embodiment of the process, the feed gas stream can include a hydrat promoter. Additionally or alternatively, in any embodiment of the process, the aqueous phase stream can include a hydrate promoter.

Figure 7:
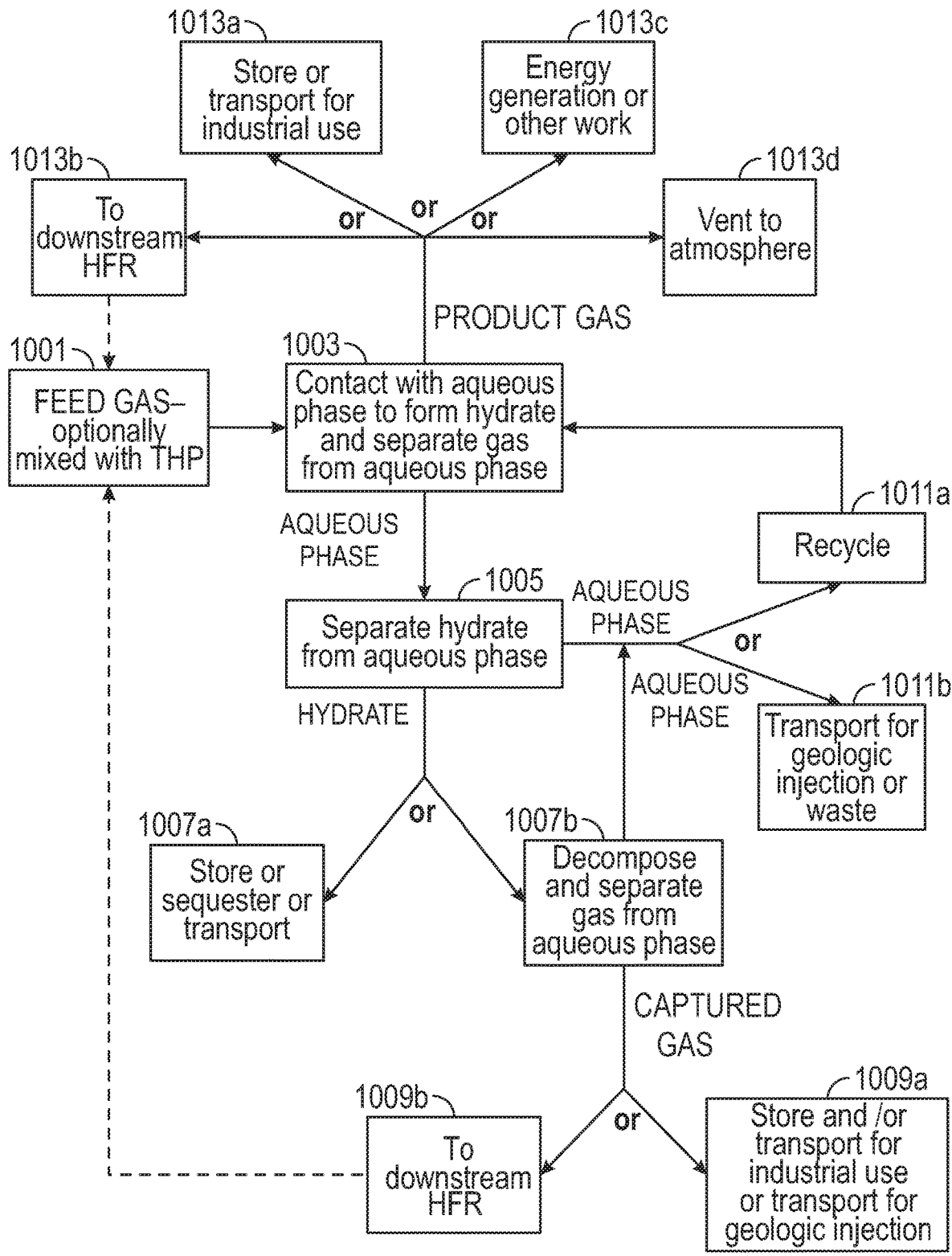
FIG. 7 is a flow chart of a $CO_2$ separating process.

FIG. 7 illustrates the flow of the disclosed process. At 1001, a feed gas is provided in a gas stream that at 1003 is contacted with an aqueous phase stream to form a hydrate in the aqueous phase stream, and the gas stream and aqueous phase stream are separated one from the other. At 1005, the hydrate is separated from the aqueous phase and at 1007 is stored or transported for use in another industrial process, or is sequestered (1007a) or decomposed and separated into its component gas(es) and aqueous phase (1007b). At 1009, the gas obtained from decomposition of the hydrate is stored for transport or used directly in a further industrial process or transported for injection into a geologic formation (1009a), or used as a feed to a downstream iteration of the process (1009b).

At 1011, the aqueous phase obtained from the hydrate separation can be recycled to the countercurrent flow (1011a) or transported for injection into a geologic formation or sent to waste (1011b).

At 1013, the gas product of the countercurrent separation is collected and stored o transported for further industrial use (1013a), used as a feed to a downstream iteration of the process above (1013b), stored or transported under pressure to generate electricity, e.g. by driving a turbine or to do other useful work (1013c), or if sufficiently pure to meet regulatory standards, vented to the atmosphere, e.g. as $N_2$-rich gas (1013d).

EXAMPLES

The following examples of gas separations are intended to be illustrative only and not limiting the scope of the invention, which is defined solely by the claims following. Example separations of $CO_2$ from $N_2$ are simulated by a computational model. The model includes a combination of hydrate formation thermodynamics and multistage countercurrent tower operation. The integrated model takes as inputs feed composition and operating condition and iteratively generates phase fractions and compositions as outputs.

Example 1: Pressure Requirement for Hydrate Formation

As a first step to study the $CO_2$—$N_2$ system, simulations are used to estimate the minimum pressure required for hydrate formation. FIG. 1 shows the minimum pressure requirement as a function of $N_2$ mole fraction in the feed gas. As the feed becomes dilute in $CO_2$, the pressure requirement for hydrate formation increases exponentially. The instance of NGCC flue gas comprising ~5% $CO_2$ is shown, and a requirement for a fairly high minimum pressure (~2035 psia) to obtain hydrate formation is found.

The minimum pressure requirement for feeds containing higher concentrations of CO (e.g., biogas, landfill gas) are not so high (e.g., feed containing 50% $CO_2$ requires a minimum pressure of 413.9 psia). Thus, using a $CO_2$ concentrating process ahead of the hydrate-formation based separation process can provide for use of lower operating pressures and/or higher operating temperatures for the hydrate formation-based process.

Figure 9:
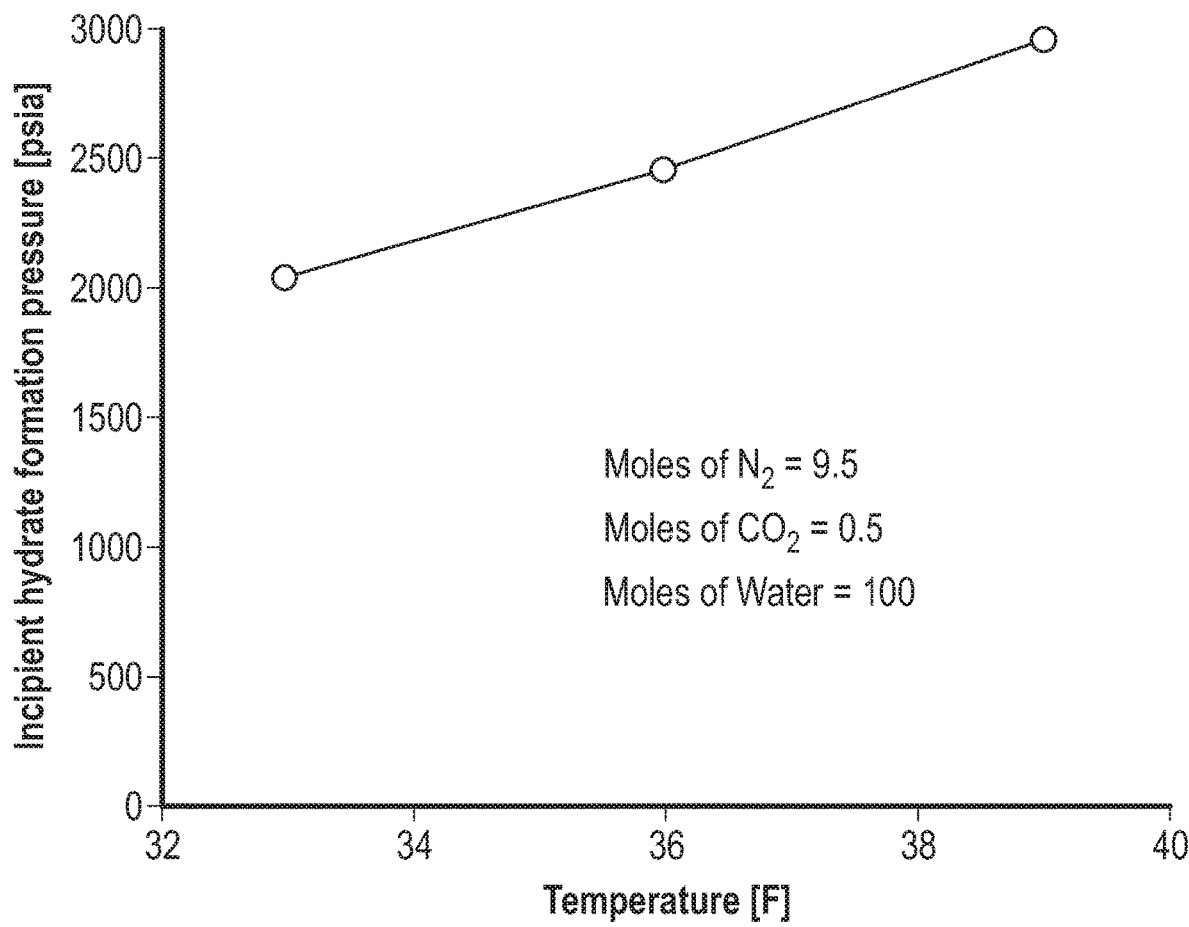
FIG. 9 is a plot of incipient hydrate formation pressure vs. temperature for a gas feed having component ratios of 9.5 moles $N_2$:0.5 moles $CO_2$:100 moles water.

To understand the sensitivity of the minimum required pressure with operating temperature, the temperature of the simulation was varied from 33° F. to 39° F. for a mixture of 5% $CO_2$-95% $N_2$ as the feed. FIG. 9 shows that pressure requirement for hydrate formation increases significantly as temperature increases (by ~150 psia per ° F.). Therefore, for the 5% $CO_2$-95% $N_2$ separation system, it appears that the preferred temperature for a single stage operation is 33° F. or lower.

Example 2: Operating Temperature Window

To determine the temperature range for a separation at a fixed pressure, simulation is conducted at various $CO_2/N_2$ feed compositions and a selected pressure. FIG. 2 shows the complete operating temperature window at a fixed pressure of 2200 psia. The incipient hydrate curve indicates the temperature below which the hydrate phase exists (i.e., the maximum allowed temperature for hydrate formation). The incipient vapor curve indicates the temperature below which there is no vapor phase. The available operating window for the separation is the region between these two curves.

Example 3: Process Modeling of the $CO_2$—$N_2$ System

Our process model conducts the thermodynamic calculations for equilibria at every stage, and iteratively converges the system of equations that describe a countercurrent equilibrium separation. At each stage of a multistage separation, feed composition and operating conditions are used to estimate the thermodynamic equilibrium-based phase fractions and composition.

With this generalized model, we are able to evaluate single stage and multi-stage, counter-current configurations for separation performance in terms of recovery and purity.

The simulation is applied to the case of a 5% $CO_2$-95% $N_2$ feed. The temperature range for the simulation is arbitrarily set from 31 to 35° F. Results are shown in FIGS. 4 and 5, and summarized in Table 1. A 3-stage countercurrent tower is sufficient to provide >90% $CO_2$ capture in the combined aqueous and hydrate phases, at a pressure of 2200 psia. An $N_2$-rich product gas stream is 99.5% pure; it can be used for some power recovery or discarded to the atmosphere. 90.9% of the input $N_2$ is recovered in this product gas stream. As shown in FIG. 4, if all captured $CO_2$ is recovered from the aqueous and hydrate phases, the overall $CO_2$ recovery is 92.6% in the gas stream. On the other hand, if $CO_2$ is captured in the hydrate phase for sequestration, but some $CO_2$ is dissolved in the aqueous phase (FIG. 5), the overall $CO_2$ recovery in hydrate phase is 38.4%. Recycling water with dissolved $CO_2$ will influence the tower performance.

FIG. 2 shows the operating window for a separation of $CO_2$ from $N_2$ at 2200 psia. Convergence of the incipient hydrate formation curve and the incipient vapor formation curves at ~90% indicates the maximum $CO_2$ purity that can be achieved using multiple stages. Table 1 summarizes the results of simulations of the system configurations shown in FIGS. 4 (capture in hydrate and eventually recovered as gas) and 5 (capture in hydrate and aqueous phase).

| Primary mechanism for $CO_2$ capture | — | Hydrate | Hydrate + Aqueous Solubility |
|---|---|---|---|
| $CO_2$ recovery | — | 38% | 93% |
| $CO_2$ purity | 5% | 23% | 35% |
| $N_2$ recovery | — | 91% | 91% |
| $N_2$ purity | 95% | 99.5% | 99.5% |

Table 1:

Representative performance of a multistage hydrate-based countercurrent separator. Feed contains 95% $N_2$, 5% $CO_2$, and excess water, corresponding to a typical NGCC flue gas. Pressure is fixed at 2200 psia. A highly pure $N_2$ stream (99.5%) can be recovered at the top, which can be used for power recovery and later on discarded safely. $CO_2$ is captured in both hydrate and aqueous phases. 38-93% $CO_2$ is captured from the flue gas. Captured $CO_2$ stream has a moderate purity between 23-35%, which is a substantial improvement over the flue gas $CO_2$ purity (5%).

Example 4: Effect of Operating Conditions on the Operating Window

Figure 11:
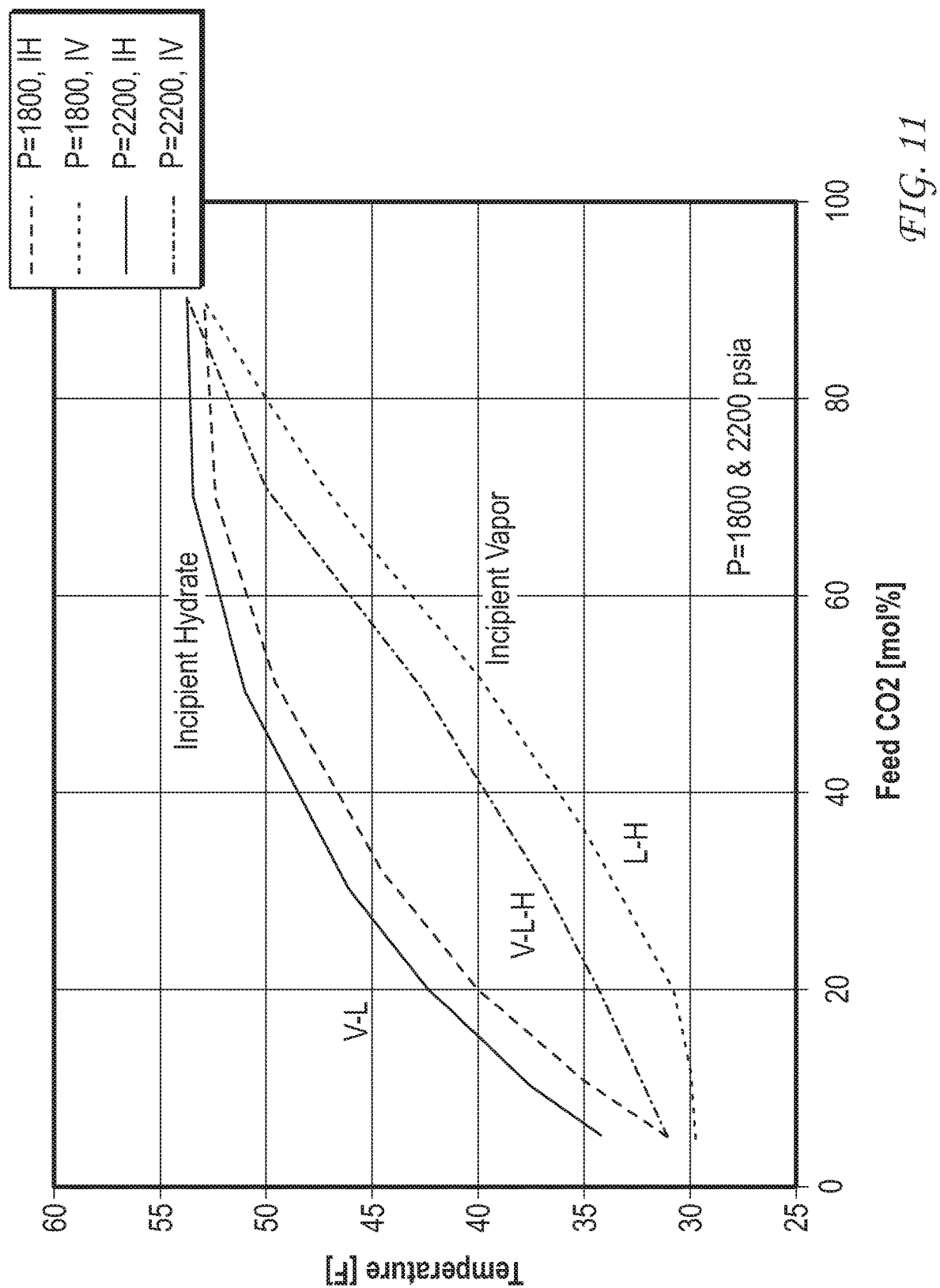
FIG. 11 shows the effect of lowering the operating pressure on the operating window for a hydrate-based gas separation.
Figure 12:
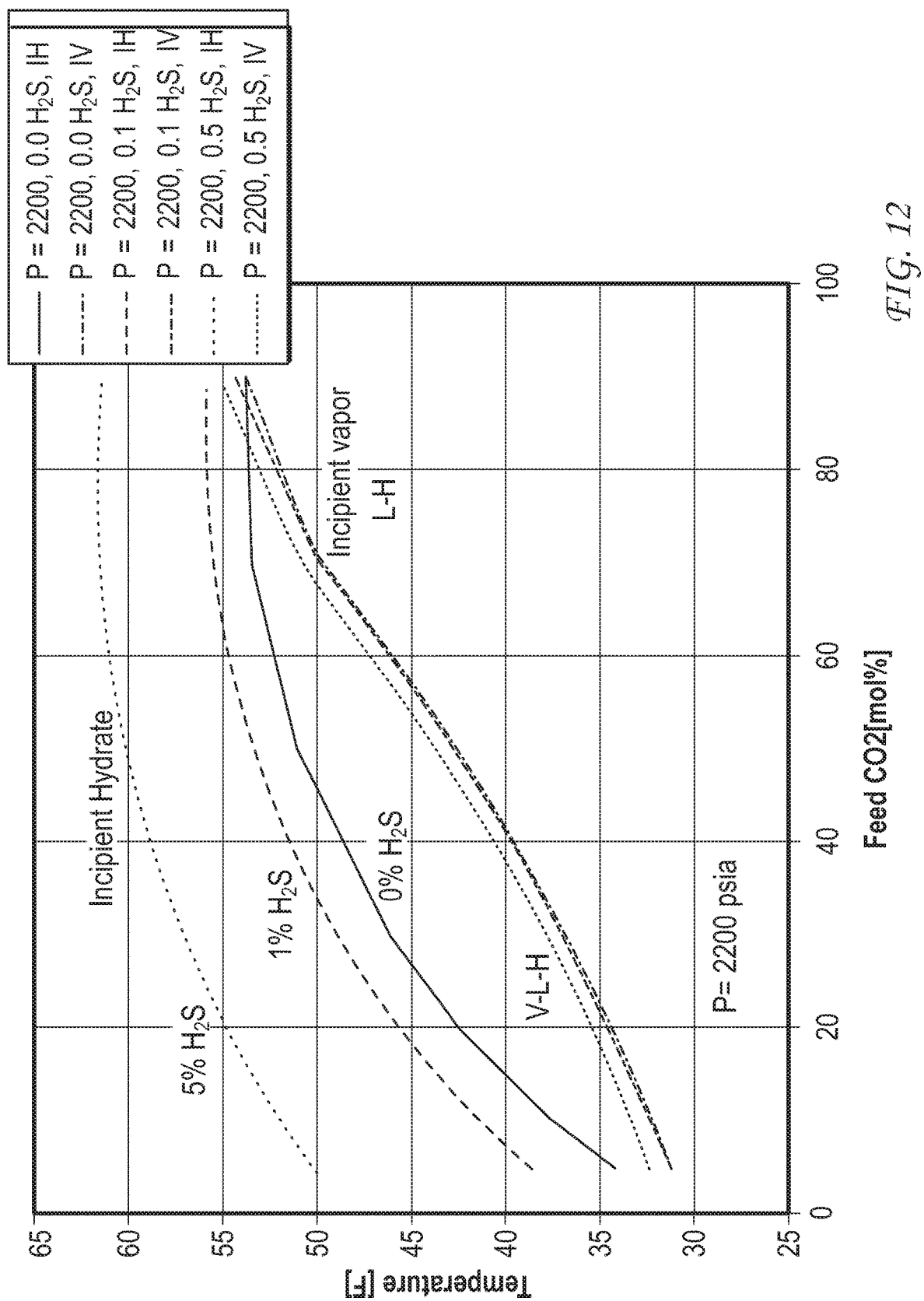
FIG. 12 shows the effect of addition of $H_2S$ to the feed gas on the operating window for a hydrate-based gas separation.

FIG. 2 shows the operating temperature window for the $CO_2/N_2$ separation system at a pressure of 2200 psia. This example demonstrates the individual effects of pressure (FIG. 11) and $H_2S$ additive concentration (FIG. 12) on the operating temperature window.

Conditions for the simulation other than pressure and additive concentration are the same as those in FIG. 2. At lower pressure, the operating temperature window is narrower, especially for the inlet composition of 5% feed $CO_2$, i.e., the HFR operation is more challenging due to the narrow temperature range of the operating window. With the addition of $H_2S$, the operating temperature window becomes wider, i.e., the HFR operation becomes easier due to wider temperature range.

Figure 13:
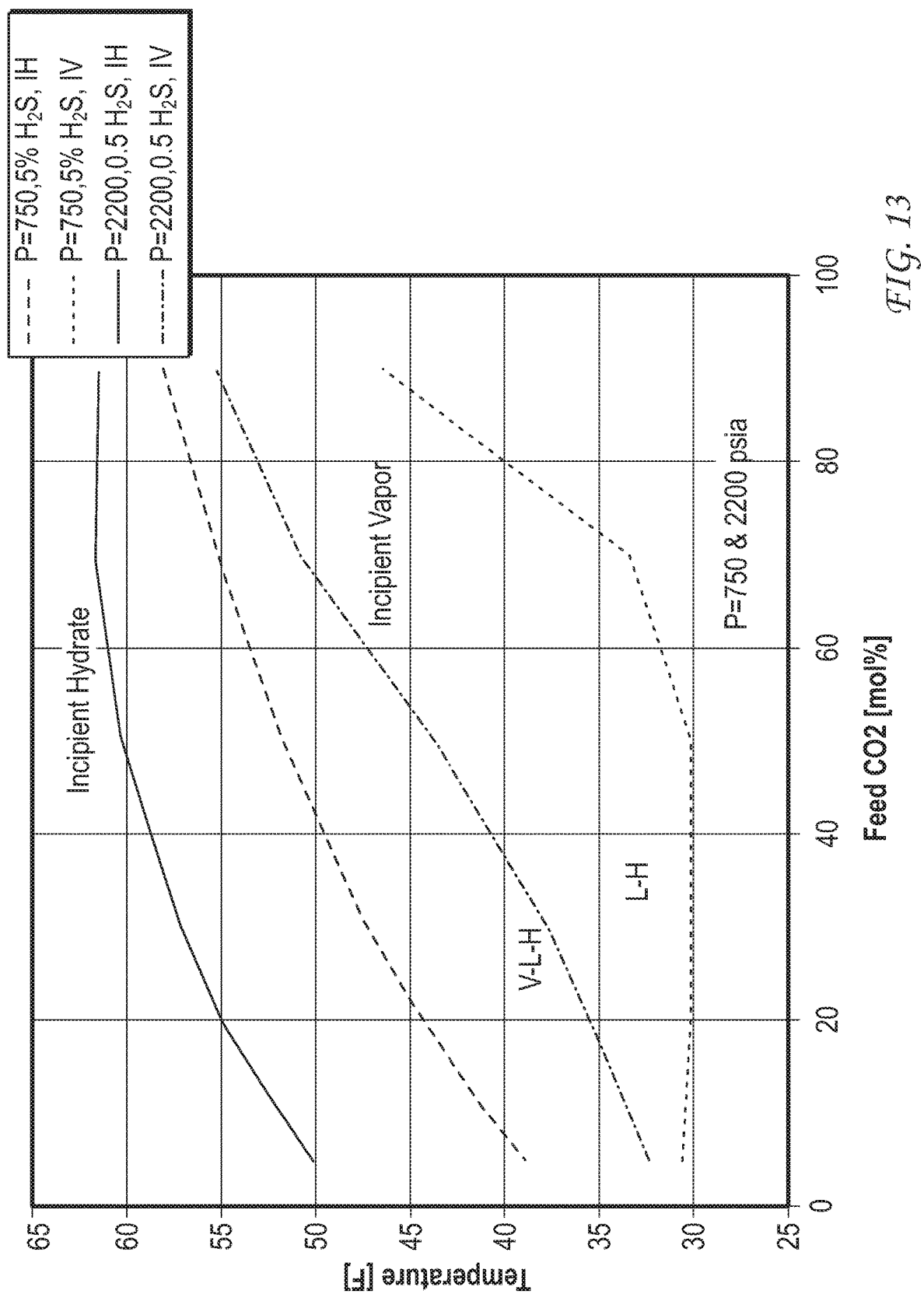
FIG. 13 shows the effect of lowering the operating pressure and $H_2S$ addition to the feed gas on the operating window for a hydrate-based gas separation.

Widening of temperature window is an opportunity for decreasing the operating pressure. Accordingly, simulations are conducted with 5% $H_2S$ addition at lower pressure (750 psia). The results are shown in FIG. 13.

Figure 14:
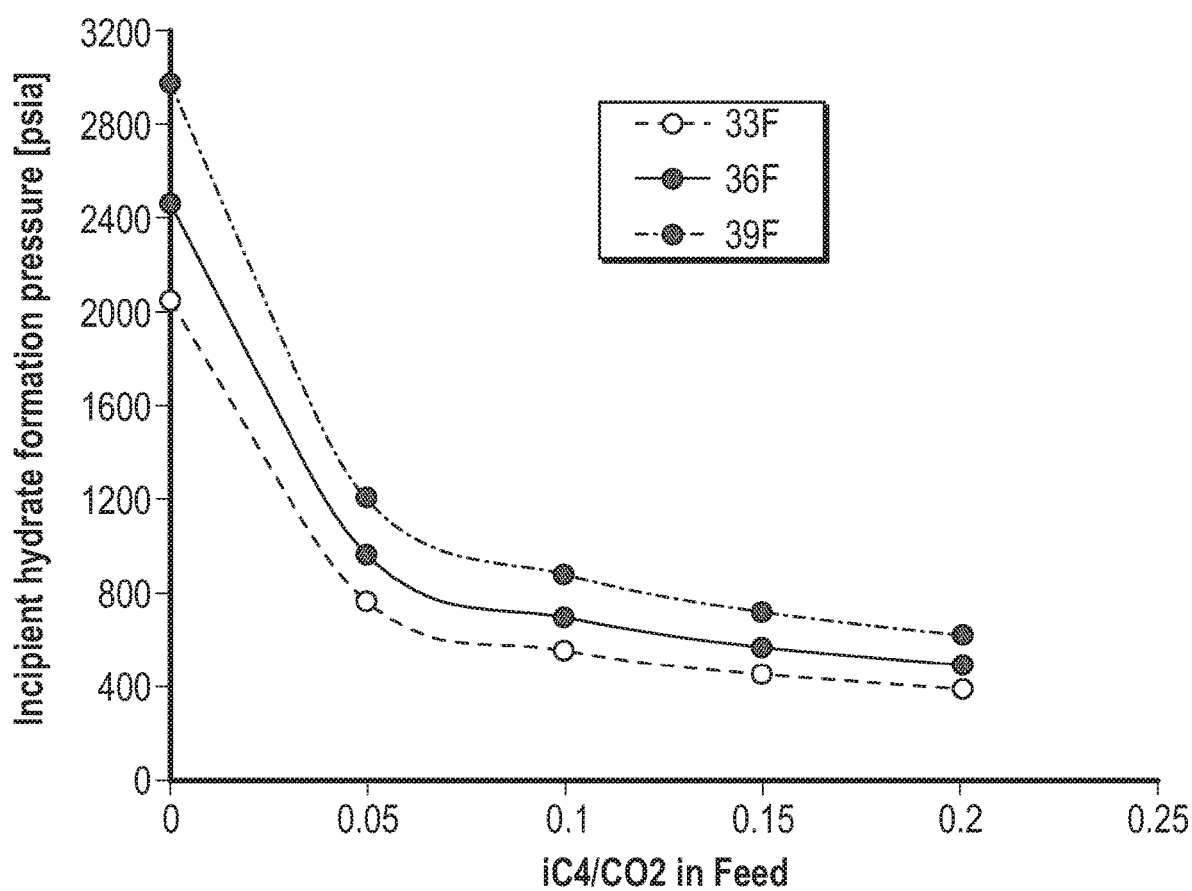
FIG. 14 shows the effect of addition of isobutane to the feed gas on the operating pressure for a hydrate-based gas separation.

There are many such additives that could be used to widen the operating window. A simulation is run to show the effect of another additive—iso-butane—on the operating window. Results are shown in FIG. 14. Even a small quantity of iso-butane in the feed results in a significant effect of reducing the minimum operating pressure.

The invention claimed is:

1. A process for purifying $CO_2$ from a gas comprising $N_2$, the process comprising intimately contacting a feed gas stream comprising $CO_2$ and $N_2$ gases and an aqueous phase stream in a countercurrent flow to form a $CO_2$-rich hydrate in the aqueous phase, a temperature $T_f$ being maintained at a gas feed stage f in the countercurrent flow, a temperature $T_2$ such that $T_2<T_f$ being maintained at a stage n>f, and a temperature $T_1$ being maintained at a stage m≤f such that $T_1 \geq T_f$;

wherein:
$T_2$ is in a range from an incipient vapor temperature for $CO_2$ to an incipient hydrate temperature for $CO_2$ at an operating pressure of the process, and
$T_1$ is a temperature at or below a temperature of convergence of the incipient $CO_2$ hydrate formation and incipient $CO_2$ vapor formation curves at the operating pressure of the process.

2. The process of claim 1, further comprising separating a gas phase from the aqueous phase stream and collecting a hydrate slurry formed in the aqueous phase and comprising hydrate particles enriched in $CO_2$.

3. The process of claim 2, further comprising concentrating the $CO_2$-rich hydrate from the hydrate slurry and sequestering the hydrate.

4. The process of claim 3, in which the hydrate is sequestered on deep ocean floor or buried in sea floor, or in which the hydrate is encapsulated.

5. The process of claim 1, further comprising collecting a $N_2$-rich gas from a gas stream after contact with the aqueous phase.

6. The process of claim 2, further comprising collecting a $N_2$-rich gas from the separated gas.

7. The process of claim 6 that is conducted at 2200 psia, $T_2$ is from 31 to 34° F. (−0.5 to 1.1° C.) and $T_1$ is about 54° F. (12.2° C.).

8. The process of claim 6, in which there are 3 stages and $T_f$ is about 33° F. (0.5° C.), $T_1$ is about 35° F. (1.6° C.) and $T_2$ is about 31° F. (−0.5° C.).

9. The process of claim 1, in which the feed gas stream comprises a hydrate promoter.

10. The process of claim 1, in which the aqueous phase stream comprises a hydrate promoter.

11. The process of claim 9, in which the aqueous phase stream comprises a hydrate promoter.

* * * * *